O. P. NOISOM.
COMPASS.
APPLICATION FILED SEPT. 13, 1920.
1,388,292.
Patented Aug. 23, 1921.
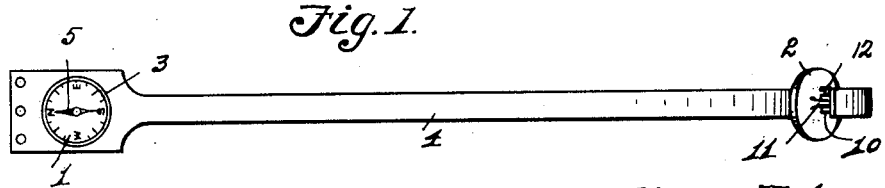
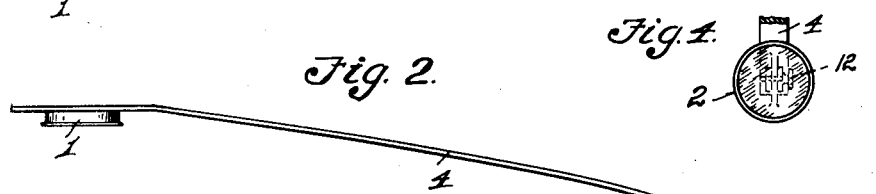
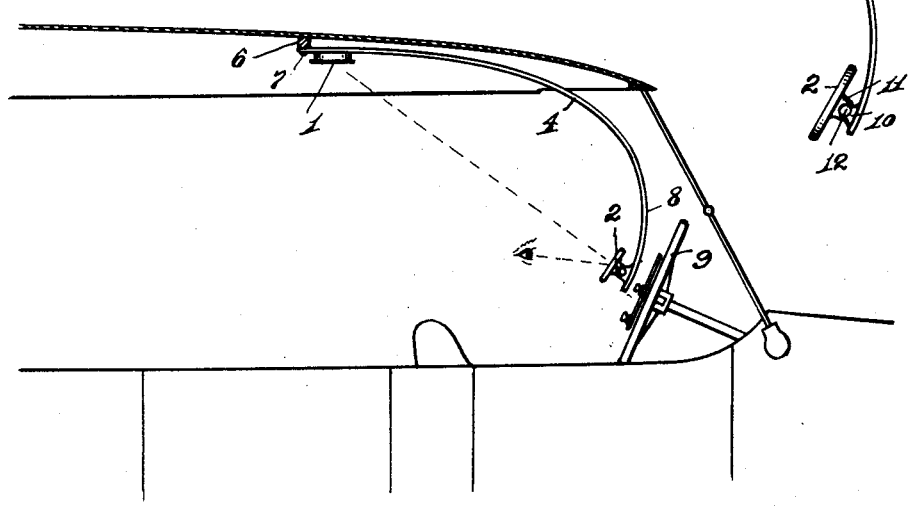
Ole P. Noisom
INVENTOR.
BY George J. Ottoch
ATTORNEY.

UNITED STATES PATENT OFFICE.

OLE P. NOISOM, OF SOUTH BEND, INDIANA.

COMPASS.

1,388,292.   Specification of Letters Patent.   Patented Aug. 23, 1921.

Application filed September 13, 1920. Serial No. 410,048.

*To all whom it may concern:*

Be it known that I, OLE P. NOISOM, a citizen of the United States, residing at South Bend, in the county of St. Joseph, and State of Indiana, have invented certain new and useful Improvements in Compasses, of which the following is a specification.

The invention relates to compasses used in connection with automobiles, and has for its object to provide a device of this character, wherein the compass is carried by one end of a flexible arm, which arm is attached to the top of the automobile at a point remote from the steel parts of the machine and steering wheel and to provide the other end of the flexible arm with an adjustable mirror, located adjacent the steering wheel and in front of the operator, in which mirror the compass face will be reflected thereby allowing the operator to ascertain the direction of travel of the automobile.

A further object is to locate a compass, at a point remote from the steering wheel of an automobile and preferably beneath the top and to provide mirror means adjacent the steering wheel and operator so that the operator can take a reading of the compass in the mirror.

With the above and other objects in view the invention resides in the combination and arrangement of parts as hereinafter set forth, shown in the drawings described and claimed, it being understood that changes in the precise embodiment of the invention may be made within the scope of what is claimed without departing from the spirit of the invention.

In the drawings:—

Figure 1 is a bottom plan view of the device showing the same detached from the automobile top.

Fig. 2 is a side elevation of the device.

Fig. 3 is a side elevation of the device showing the same attached to one of the cross bows of an automobile top.

Fig. 4 is a plan view of the reflecting mirror.

It has been found that where compasses are used on automobiles and located adjacent the steering wheel or the body of the automobile, that the metal parts of the automobile cause a material deviation in the compass and consequently a true reading of direction of travel cannot be made. To overcome this difficulty the compass 1 is located at a remote point from the steering wheel and metal parts of the automobile and is read by the operator in a mirror 2 located adjacent the steering wheel and preferably forwardly of the operator, thereby allowing the operator to read the compass without turning his head. The compass 1 is of the inverted type and is mounted in a casing 3, which casing is carried by the flexible metal arm 4, said metal arm being formed of brass, which is non-magnetic and which will not effect the action of the compass needle 5. The rear end of the flexible metal arm 4 is secured to the wooden bow 6 of the automobile top by means of screws 7, said metal arm extending forwardly and downwardly and having its end 8 preferably located adjacent the steering wheel 9 of the automobile and forwardly of the operator so that the mirror 2 when properly adjusted will reflect the compass face thereby allowing the operator to make a compass reading at any time. The flexible metal arm 4 is flexible and bendable so that the same may be applied to different designs of automobiles and also bent to a proper adjustment in relation to the operator's eyes. The end 8 of the arm 4 is provided with spaced ears 10, which receive therebetween an apertured lug 11 carried by the rear face of the mirror 2 and through apertures of the ears 10, and the aperture of the lug 11 a thumb screw 12 passes, by means of which thumb screw the mirror 2 is held in any vertical position to which it may have been adjusted.

It will be seen that a compass and compass reading device for an automobile is provided, wherein the compass is located at a remote point from the metallic parts of the automobile, which compass may be read from a point adjacent the operator's seat and steering wheel, thereby obviating the usual inaccuracy and errors found in compasses used on motor driven vehicles wherein the compass is located adjacent the steering wheel or the metal parts of the automobile.

The invention having been set forth what is claimed as new and useful is:—

1. The combination with a motor driven vehicle having a top and a steering wheel, of a compass located adjacent said top and to the rear of said steering wheel, a supporting arm, said compass being substantially horizontally disposed and carried by the supporting arm, the rear end of said supporting arm being secured to the top, said supporting arm extending forwardly and curving downwardly and terminating adjacent the steering wheel and a reflecting mirror carried by the downwardly extending portion of said arm and entirely supported by said arm.

2. The combination with a motor driven vehicle having a top and steering wheel, of a compass located adjacent said top and to the rear of said steering wheel, a supporting arm, said compass being carried by the supporting arm, the rear end of said supporting arm being secured to the top of the vehicle, said supporting arm being formed of pliable material and extending forwardly and downwardly and terminating adjacent the rear side of the steering wheel and a reflecting mirror for reflecting the compass face carried by the forward and downwardly extending end of the arm and entirely supported by said arm.

In testimony whereof I affix my signature.

OLE P. NOISOM.